(12) United States Patent
Li

(10) Patent No.: US 9,876,431 B2
(45) Date of Patent: Jan. 23, 2018

(54) CONSTANT ON-TIME CONTROL METHOD USED IN BUCK-BOOST CONVERTERS

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/389,390

(22) Filed: Dec. 22, 2016

(65) Prior Publication Data

US 2017/0187290 A1  Jun. 29, 2017

(30) Foreign Application Priority Data

Dec. 23, 2015  (CN) .......................... 2015 1 0976674

(51) Int. Cl.
*H02M 3/158* (2006.01)
*H02M 1/00* (2006.01)

(52) U.S. Cl.
CPC .. *H02M 3/1582* (2013.01); *H02M 2001/0058* (2013.01)

(58) Field of Classification Search
CPC .... H02M 3/156–3/158; H02M 3/1582; H02M 3/1584; H02M 3/1588; G05F 1/56; G05F 1/565; G05F 1/575; Y02B 70/1466
USPC ........ 323/235, 240, 242, 271, 274, 275, 277
See application file for complete search history.

(56) References Cited

U.S. PATENT DOCUMENTS

| 3,560,829 | A | * | 2/1971 | Brennan | ................. G05D 3/18 318/599 |
| 7,411,316 | B2 | * | 8/2008 | Pai | ......................... H02M 1/10 307/81 |
| 7,576,529 | B2 | * | 8/2009 | Ishino | ................. H02M 3/1588 323/225 |
| 8,193,798 | B1 | * | 6/2012 | Pace | ..................... H02M 3/156 323/284 |
| 2001/0019489 | A1 | * | 9/2001 | Hosotani | ............. H02M 3/3385 363/18 |
| 2014/0285170 | A1 | | 9/2014 | Deng | |
| 2014/0354250 | A1 | | 12/2014 | Deng | |
| 2016/0190931 | A1 | | 6/2016 | Zhang | |
| 2016/0315535 | A1 | | 10/2016 | Ouyang | |

* cited by examiner

*Primary Examiner* — Yemane Mehari
(74) *Attorney, Agent, or Firm* — Perkins Coie LLP

(57) ABSTRACT

A control method used in a four-switch buck-boost converter includes: sensing the output voltage and generating a feedback signal; generating a compensation signal based on a reference signal and the feedback signal; sensing the current flowing through the inductor and generating a current sensing signal; comparing the current sensing signal with the compensation signal; turning on the first and third transistors and turning off the second and fourth transistors when the current sensing signal reduces to be lower than the compensation signal; turning off the first transistor and turning on the second transistor when the on-time of the first transistor in one switching period reaches a first time threshold; and turning off the third transistor and turning on the fourth transistor when the on-time of the third transistor reaches a second time threshold.

16 Claims, 10 Drawing Sheets

CONSTANT ON-TIME CONTROL METHOD USED IN BUCK-BOOST CONVERTERS

CROSS-REFERENCE TO RELATED APPLICATIONS

This application claims the benefit of CN application 201510976674.x, filed on Dec. 23, 2015, and incorporated herein by reference.

TECHNICAL FIELD

The present invention generally relates to electronic circuits, and more particularly but not exclusively, to buck-boost converters and control methods thereof.

BACKGROUND

Portable electronic devices are becoming smaller and smaller, which accordingly causes the volume and capacity of their batteries to decrease. In order to improve endurance of the batteries, power supply modules of these electronic devices are required to provide a stable output voltage when the battery voltage varies in a wide range. Buck-boost converters thus are widely used in these applications.

FIG. 1 illustrates a traditional buck-boost converter with four transistors. Energy is stored in the inductor L when the transistors S1, S3 are on and the transistors S2, S4 are off. The stored energy is then provided to a load when the transistors S1, S3 are off and the transistors S2, S4 are on. Since the transistors S1~S4 keep switching during operation, power loss of this traditional buck-boost converter is large.

To reduce the power loss, different working modes, such as BUCK mode and BOOST mode, are adopted. In the BOOST mode, the transistor S1 is maintained on and the transistor S2 is maintained off, while the transistors S3 and S4 are controlled using a fixed frequency peak current control scheme. In the BUCK mode, the transistor S4 is maintained on and the transistor S3 is maintained off. The transistors S1 and S2 are controlled by the fixed frequency peak current control scheme.

However, logic used to determine the working mode in prior arts is complicated. And abrupt mode transition could induce spikes on the output voltage.

SUMMARY

Embodiments of the present invention are directed to a control method of a buck-boost converter, wherein the buck-boost converter converting an input voltage into an output voltage includes a first transistor, a second transistor, a third transistor, a fourth transistor and an inductor. The control method comprises: sensing the output voltage and generating a feedback signal; generating a compensation signal based on a reference signal and the feedback signal; sensing the current flowing through the inductor and generating a current sensing signal; comparing the current sensing signal with the compensation signal; turning on the first and third transistors and turning off the second and fourth transistors when the current sensing signal reduces to be lower than the compensation signal; turning off the first transistor and turning on the second transistor when the on-time of the first transistor in one switching period reaches a first time threshold; and turning off the third transistor and turning on the fourth transistor when the on-time of the third transistor reaches a second time threshold.

Embodiments of the present invention are also directed to a buck-boost converter comprising: a first transistor having a first terminal, a second terminal and a control terminal, wherein the first terminal is configured to receive an input voltage; a second transistor having a first terminal, a second terminal and a control terminal, wherein the first terminal is coupled to the second terminal of the first transistor, the second terminal is coupled to a reference ground; an inductor having a first terminal and a second terminal, wherein the first terminal is coupled to the second terminal of the first transistor and the first terminal of the second transistor; a third transistor having a first terminal, a second terminal and a control terminal, wherein the first terminal is coupled to the second terminal of the inductor, the second terminal is coupled to the reference ground; a fourth transistor having a first terminal, a second terminal and a control terminal, wherein the first terminal is coupled to the second terminal of the inductor and the first terminal of the third transistor, the second terminal is configured to provide an output voltage; an output capacitor coupled between the second terminal of the fourth transistor and the reference ground; a feedback circuit configured to generate a feedback signal indicative of the output voltage; a current sensing circuit configured to generate a current sensing signal indicative of the current flowing through the inductor; an error amplifying circuit having a first input terminal, a second input terminal and an output terminal, wherein the first input terminal is configured to receive a reference signal, the second input terminal is coupled to the feedback circuit, and wherein based on the reference signal and the feedback signal, the error amplifying circuit generates a compensation signal at the output terminal; a comparing circuit having a first input terminal, a second input terminal and an output terminal, wherein the first input terminal is coupled to the output terminal of error amplifying circuit, the second input terminal is coupled to the current sensing circuit, and wherein the comparing circuit compares the current sensing signal with the compensation signal and generates a set signal at the output terminal; a first on-time control circuit having an input terminal and an output terminal, wherein the input terminal is coupled to the output terminal of the comparing circuit, and wherein based on the set signal, the first on-time control circuit compares the on-time of the first transistor in one switching period with a first time threshold and generates a first on-time control signal at the output terminal; a second on-time control circuit having an input terminal and an output terminal, wherein the input terminal is coupled to the output terminal of the comparing circuit, and wherein based on the set signal, the second on-time control circuit compares the on-time of the third transistor with a second time threshold and generates a second on-time control signal at the output terminal; a first logic circuit having a first input terminal, a second input terminal and an output terminal, wherein the first input terminal is coupled to the output terminal of the comparing circuit, the second input terminal is coupled to the output terminal of the first on-time control circuit, and wherein based on the set signal and the first on-time control signal, the first logic circuit generates a first control signal at the output terminal; a second logic circuit having a first input terminal, a second input terminal and an output terminal, wherein the first input terminal is coupled to the output terminal of the comparing circuit, the second input terminal is coupled to the output terminal of the second on-time control circuit, and wherein based on the set signal and the second on-time control signal, the second logic circuit generates a second control signal at the output terminal; a first driving circuit coupled to the output terminal of the first logic circuit, wherein based on the first control signal, the first driving circuit generates a first driving signal and a second driving signal to respectively control the first and second transistors; and a second driving circuit coupled to the output terminal of the second logic circuit, wherein based on the second control signal, the second driving circuit generates a third driving signal and a fourth driving signal to respectively control the third and fourth transistors.

Embodiments of the present invention are further directed to a controller used in a buck-boost converter, wherein the buck-boost converter converting an input voltage into an output voltage includes a first transistor, a second transistor, a third transistor, a fourth transistor and an inductor. The controller comprises: a comparing circuit configured to receive a feedback signal indicative of the output voltage and generate a set signal in accordance with the feedback signal; a first on-time control circuit having an input terminal and an output terminal, wherein the input terminal is coupled to the comparing circuit, and wherein based on the set signal, the first on-time control circuit compares the on-time of the first transistor in one switching period with a first time threshold and generates a first on-time control signal at the output terminal; a second on-time control circuit having an input terminal and an output terminal, wherein the input terminal is coupled to the comparing circuit, and wherein based on the set signal, the second on-time control circuit compares the on-time of the third transistor with a second time threshold and generates a second on-time control signal at the output terminal; a first logic circuit having a first input terminal, a second input terminal and an output terminal, wherein the first input terminal is coupled to the output terminal of the comparing circuit, the second input terminal is coupled to the output terminal of the first on-time control circuit, and wherein based on the set signal and the first on-time control signal, the first logic circuit generates a first control signal at the output terminal; a second logic circuit having a first input terminal, a second input terminal and an output terminal, wherein the first input terminal is coupled to the output terminal of the comparing circuit, the second input terminal is coupled to the output terminal of the second on-time control circuit, and wherein based on the set signal and the second on-time control signal, the second logic circuit generates a second control signal at the output terminal; a first driving circuit coupled to the output terminal of the first logic circuit, wherein based on the first control signal, the first driving circuit generates a first driving signal and a second driving signal to respectively control the first and second transistors; and a second driving circuit coupled to the output terminal of the second logic circuit, wherein based on the second control signal, the second driving circuit generates a third driving signal and a fourth driving signal to respectively control the third and fourth transistors.

In the embodiments of the present invention, a novel constant on-time control scheme adaptive to the buck-boost converter is utilized to realize automatic and smooth mode transition. System design and test become easier. And the spikes on the output voltage during mode transition have also been removed.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
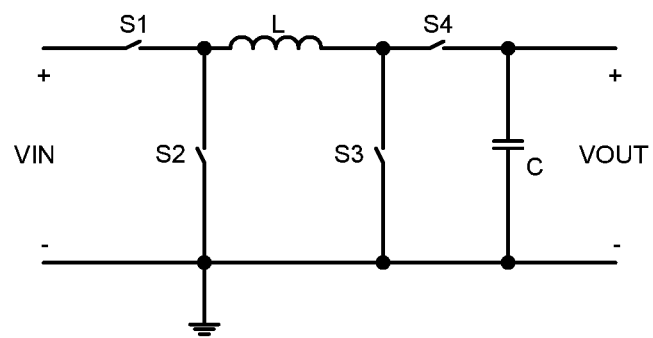
FIG. 1 illustrates a traditional buck-boost converter with four transistors.
Figure 2:
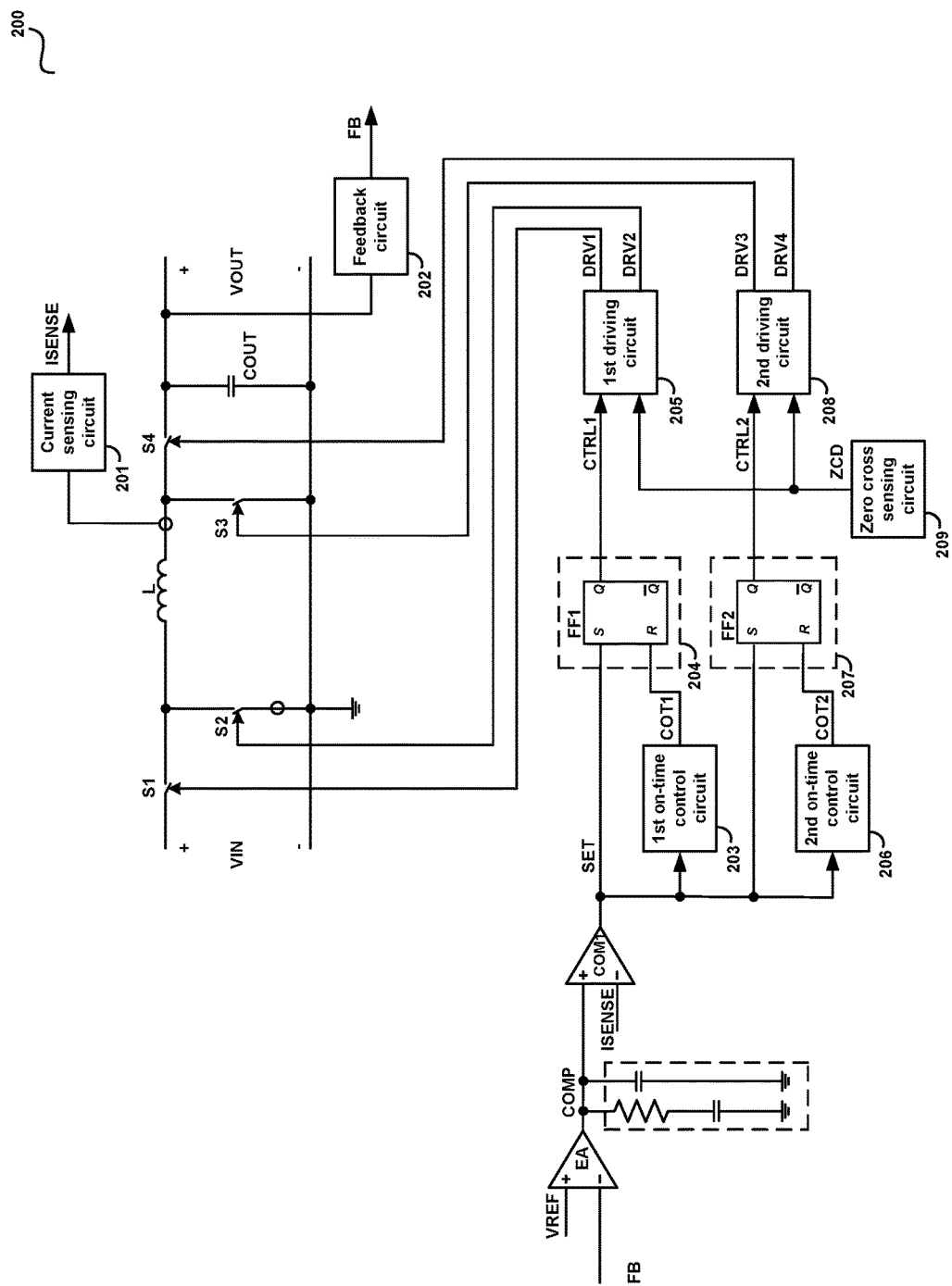
FIG. 2 is a block diagram of a buck-boost converter 200 in accordance with an embodiment of the present invention.

FIG. 2 is a block diagram of a buck-boost converter 200 in accordance with an embodiment of the present invention. The buck-boost converter 200 comprises transistors S1~S4, an inductor L, an output capacitor COUT, an error amplifier EA, a comparator COM1, a current sensing circuit 201, a feedback circuit 202, a first on-time control circuit 203, a first logic circuit 204, a first driving circuit 205, a second on-time control circuit 206, a second logic circuit 207 and a second driving circuit 208. The transistor S1 has a first terminal, a second terminal and a control terminal, wherein the first terminal is configured to receive an input voltage VIN. The transistor S2 has a first terminal, a second terminal and a control terminal, wherein the first terminal is coupled to the second terminal of the transistor S1, the second terminal is coupled to a reference ground. The inductor L has a first terminal and a second terminal, wherein the first terminal is coupled to the second terminal of the transistor S1 and the first terminal of the transistor S2. The transistor S3 has a first terminal, a second terminal and a control terminal, wherein the first terminal is coupled to the second terminal of the inductor L, the second terminal is grounded. The transistor S4 has a first terminal, a second terminal and a control terminal, wherein the first terminal is coupled to the second terminal of the inductor L and the first terminal of the transistor S3, the second terminal is configured to provide an output voltage VOUT. The output capacitor COUT is coupled between the second terminal of the transistor S4 and the reference ground. The transistors S1~S4 might be any controllable semiconductor devices, such as MOSFETs, IGBTs and so on.

The current sensing circuit 201 senses the current flowing through the inductor L and generates a current sensing signal ISENSE. The current sensing circuit 201 can be realized by any of sensing resistors, current transformers, current mirrors, etc. The feedback circuit 202 is coupled to the second terminal of the transistor S4. It senses the output voltage VOUT and generates a feedback signal FB.

The error amplifier EA has a non-inverting input terminal, an inverting input terminal and an output terminal, wherein the non-inverting input terminal is configured to receive a reference signal VREF, the inverting input terminal is coupled to the feedback circuit 202, and wherein based on the reference signal VREF and the feedback signal FB, the error amplifier EA generates a compensation signal COMP at the output terminal. Typically, as shown in FIG. 2, a compensation network consisting of resistors and capacitors is provided between the output terminal of the error amplifier EA and the reference group. Although the error amplifier EA is adopted in the embodiment of FIG. 2, people of ordinary skills in the art could understand that other analog or digital circuits with error amplifying function are also applicable here.

The comparator COM1 has a non-inverting input terminal, an inverting input terminal and an output terminal, wherein the non-inverting input terminal is coupled to the output terminal of error amplifier EA, the inverting input terminal is coupled to the current sensing circuit 201. The comparator COM1 compares the current sensing signal ISENSE with the compensation signal COMP and generates a set signal SET at the output terminal. Obviously, this comparator COM1 could be replaced by other suitable analog or digital circuits which are capable of comparing.

The first on-time control circuit 203 has an input terminal and an output terminal, wherein the input terminal is coupled to the output terminal of the comparator COM1. Based on the set signal SET, the first on-time control circuit 203 compares the on-time of the transistor S11 in one switching period with a first time threshold Ton1 and generates a first on-time control signal COT1 at the output terminal. The first time threshold Ton1 is proportional to the output voltage VOUT and inversely proportional to the input voltage VIN. In one embodiment, it could be expressed as:

$$Ton1 = Tperiod * \frac{VOUT}{VIN} \quad (1)$$

wherein Tperiod is an expected switching period value.

The second on-time control circuit 206 has an input terminal and an output terminal, wherein the input terminal is coupled to the output terminal of the comparator COM1. Based on the set signal SET, the second on-time control circuit 206 compares the on-time of the transistor S3 in one switching period with a second time threshold Ton2 and generates a second on-time control signal COT2 at the output terminal. The second time threshold Ton2 is proportional to the difference between the output voltage VOUT and the input voltage VIN, and is inversely proportional to the output voltage VOUT. In one embodiment, it could be expressed as:

$$Ton2 = Tperiod * \frac{VOUT - VIN}{VOUT} \quad (2)$$

The first logic circuit 204 has a first input terminal, a second input terminal and an output terminal, wherein the first input terminal is coupled to the output terminal of the comparator COM1, the second input terminal is coupled to the output terminal of the first on-time control circuit 203. Based on the set signal SET and the first on-time control signal COT1, the first logic circuit 204 generates a first control signal CTRL1 at the output terminal. In one embodiment, the first logic circuit 204 includes a RS flip-flop FF1 as shown in FIG. 2.

The second logic circuit 207 has a first input terminal, a second input terminal and an output terminal, wherein the first input terminal is coupled to the output terminal of the comparator COM1, the second input terminal is coupled to the output terminal of the second on-time control circuit 206. Based on the set signal SET and the second on-time control signal COT2, the second logic circuit 207 generates a second control signal CTRL2 at the output terminal. In one embodiment, the second logic circuit 207 includes a RS flip-flop FF2 as shown in FIG. 2.

The first driving circuit 205 is coupled to the output terminal of the first logic circuit 204, wherein based on the first control signal CTRL1, the first driving circuit 205 generates driving signals DRV1 and DRV2 to respectively control the transistors S1 and S2. The driving signals DRV1 and DRV2 are generally complementary with each other. To prevent shoot through, the first driving circuit 205 typically comprises a dead time control circuit to induce dead time between the driving signals DRV1 and DRV2.

The second driving circuit 208 is coupled to the output terminal of the second logic circuit 207, wherein based on the second control signal CTRL2, the second driving circuit 208 generates driving signals DRV3 and DRV4 to respectively control the transistors S3 and S4. The driving signals DRV3 and DRV4 are generally complementary with each other. To prevent shoot through, the second driving circuit 208 typically comprise a dead time control circuit to induce dead time between the driving signals DRV3 and DRV4.

In some embodiments, a zero cross detection circuit 209 is further incorporated to avoid reverse current. The zero cross detection circuit 209 is coupled to the driving circuits 205 and 208. It is configured to detect whether the current flowing through the inductor L crosses zero, and to turn off the transistors S2 and S4, or turn on the transistors S2 and S3 when a zero cross of the inductor current has been detected. In practical applications, this zero cross could be detected based on the current flowing through either the transistor S2 or S4.

It can be concluded from FIG. 2 that, when the current sensing signal ISENSE decreases to be lower than the compensation signal COMP, the flip-flops FF1 and FF2 are both set. The transistors S1 and S3 are turned on, the transistors S2 and S4 are turned off. Once the on-time of the transistor S1 reaches the first time threshold Ton1, the flip-flop FF1 is reset to turn off the transistor S1 and turn on the transistor S2. Similarly, the flip-flop FF2 will be reset to turn off the transistor S3 and turn on the transistor S4 if the on-time of the transistor S3 reaches the second time threshold Ton2. These steps are repeated to regulate the output voltage VOUT.

When the output voltage VOUT is lower than the input voltage VIN, the second time threshold Ton2 is smaller than zero in accordance with equation (2). Determined by the second on-time control circuit 206, the on-time of the transistor S3 is equal to zero. To be more specific, the flip-flop FF2 might not be set since it is reset dominant. In this situation, the buck-boost converter 200 is working in the BUCK mode. The transistor S3 maintains off and the transistor S4 maintains on, while states of the transistors S1 and S2 are adjusted by the first on-time control circuit 203.

When the output voltage VOUT is higher than the input voltage VIN and the first time threshold Ton1 is larger than the switching period Ts of the converter, the on-time of the transistor S1 becomes equal to the switching period Ts. To be more specific, the transistor S1 would not be turned off since the on-time of the transistor S1 cannot hit the first on-time threshold Ton1 to reset the flip-flop FF1 before the current sensing signal ISENSE reduces to reach the compensation signal COMP and set the flip-flop FF1 again. In this situation, the buck-boost converter 200 is working in the BOOST mode. The transistor S1 maintains on and the transistor S2 maintains off, while states of the transistors S3 and S4 are adjusted by the second on-time control circuit 206.

When the output voltage VOUT is larger than the input voltage VIN and the first time threshold Ton1 is smaller than the switching period Ts, the buck-boost converter 200 works in a BUCK-BOOST mode. The transistors S1 and S3 are both turned on while the current sensing signal ISENSE decreases to be lower than the compensation signal COMP. According to equations (1) and (2), we can get: Ton1>Tperiod>Ton2. Therefore, the on-time of the transistor S3 is going to hit the second time threshold Ton2 first, to turn off the transistor S3 and turn on the transistor S4. Afterwards, the transistor S1 is turned off and the transistors S2 is turned on when the on-time of the transistor S1 hits the first time threshold Ton1.

As analyzed above, the novel constant on-time control adopted in the buck-boost converter 200 makes automatic and smooth mode transition come true. System design and test become easier. And the spikes on the output voltage during mode transition can also be removed.

Figure 3:
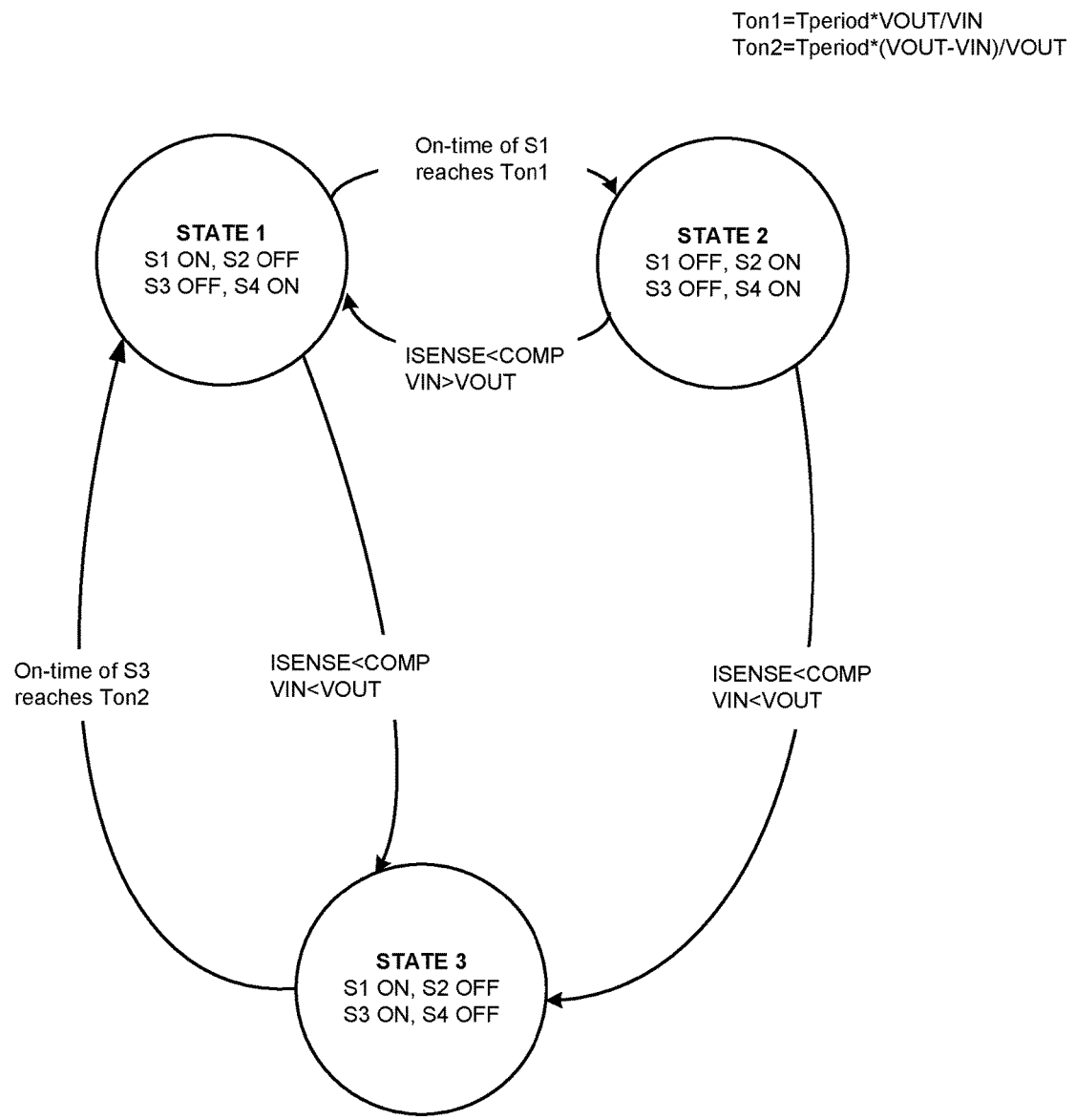
FIG. 3 is a working state diagram of the buck-boost converter 200 in accordance with an embodiment of the present invention.

FIG. 3 is a working state diagram of the buck-boost converter 200 in accordance with an embodiment of the present invention. As can been seen from the diagram, the converter 200 only switches between STATE 2 and 3 in BUCK mode, and only switches between STATE 1 and 3 in BOOST mode. In BUCK-BOOST mode, the converter 200 switches among STATE3, STATE 1 and STATE2 in sequence.

Figure 4:
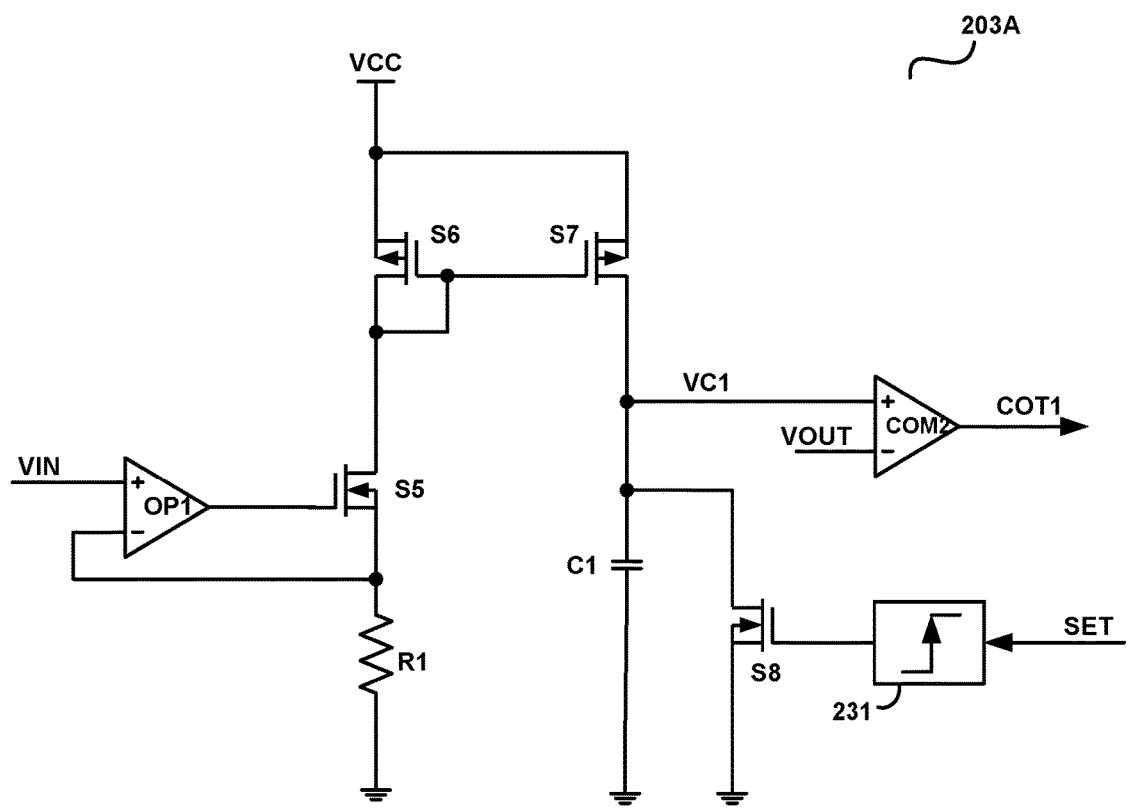
FIG. 4 schematically illustrates a first on-time control circuit 203A in accordance with an embodiment of the present invention.

FIG. 4 schematically illustrates a first on-time control circuit 203A in accordance with an embodiment of the present invention. It includes transistors S5-S8, an operational amplifier OP1, a resistor R1, a capacitor C1, a comparator COM2 and a one-shot circuit 231.

At the rising edge of the set signal SET (i.e., while the current sensing signal ISENSE reduces to be lower than the compensation signal COMP), the one-shot circuit 231 is triggered to generate a short pulse. This short pulse turns on the transistor S8 to discharge the capacitor C1 until the voltage VC1 across the capacitor C1 decreases to zero. After the short pulse is ended, the transistor S8 turns off, and the capacitor C1 is charged by the current mirror consisting of transistors S6 and S7. When the voltage VC1 rises to be higher than the output voltage VOUT, which means the on-time of the transistor S1 reaches the first time threshold Ton1, the first on-time control signal COT1 changes from logical low into logical high.

Based on the circuit shown in FIG. 4, the first time threshold Ton1 could be expressed as:

$$Ton1 = C1*R1*\frac{VOUT}{VIN} \quad (3)$$

Figure 5:
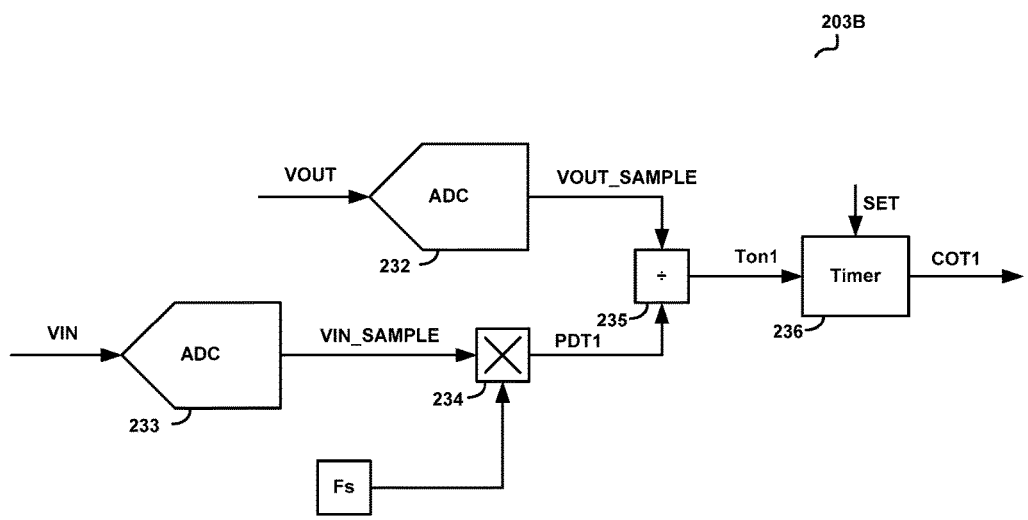
FIG. 5 schematically illustrates a first on-time control circuit 203B in accordance with an embodiment of the present invention.

The embodiment of FIG. 4 is an analog circuit. In digital control converters, the first on-time control circuit might be realized by a circuit as shown in FIG. 5. FIG. 5 schematically illustrates a first on-time control circuit 203B in accordance with an embodiment of the present invention. It includes analog-digital converters (ADC) 232, 233, a multiplier 234, a divider 235 and a timer 236. The ADC 232 and 233 respectively converts the output voltage VOUT and the input voltage VIN into digital signals VOUT_SAMPLE and VIN_SAMPLE. The multiplier 234 multiplies the signal VIN_SAMPLE with a frequency signal Fs to get a product signal PDT1, wherein the frequency signal Fs is equal to 1/Tperiod. The divider 235 divides the signal VOUT_SAMPLE by the product signal PDT1 to get the first time threshold Ton1, and subsequently sends it into the timer 236. The timer 236 starts timing at the rising edge of the set signal SET, and turns the first on-time control signal COT1 from logical low into logical high when the time value reaches the first time threshold Ton1.

The first time threshold Ton1 in the embodiment of FIG. 5 could be expressed as:

$$Ton1 = \frac{VOUT\_SAMPLE}{VIN\_SAMPLE*Fs} = Tperiod*\frac{VOUT}{VIN} \quad (4)$$

Figure 6:
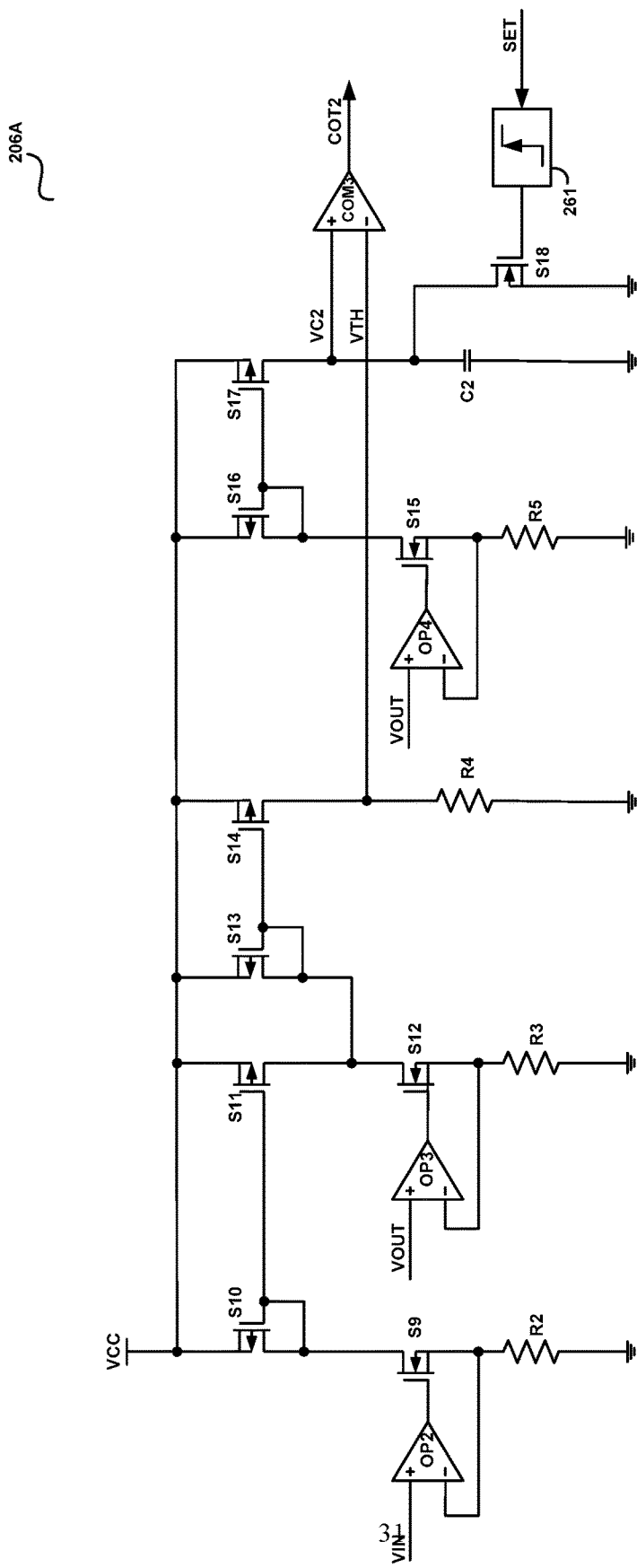
FIG. 6 schematically illustrates a second on-time control circuit 206A in accordance with an embodiment of the present invention.

FIG. 6 schematically illustrates a second on-time control circuit 206A in accordance with an embodiment of the present invention. It includes transistors S9-S18, operational amplifiers OP2-PP4, resistors R2-R5, a capacitor C2, a comparator COM3 and a one-shot circuit 261.

Referring to FIG. 6, the threshold voltage VTH compared with the voltage VC2 across the capacitor C2 can be expressed as:

$$VTH = \left(\frac{VOUT}{R3} - \frac{VIN}{R2}\right)*R4 = VOUT - VIN \quad (5)$$

wherein the resistance of resistors R2-R4 are all equal.

At the rising edge of the set signal SET, the one-shot circuit 261 is triggered to generate a short pulse. This short pulse turns on the transistor S18 to discharge the voltage VC2 across the capacitor C2 to zero. After the short pulse is ended, the transistor S18 turns off, and the capacitor C2 is charged by the current mirror consisting of transistors S16 and S17. When the voltage VC2 rises to be higher than the threshold voltage VTH, which means the on-time of the transistor S3 reaches the second time threshold Ton2, the second on-time control signal COT2 changes from logical low into logical high.

According to the analysis above, the second time threshold Ton2 here could be expressed as:

$$Ton2 = C2*R5*\frac{VTH}{VOUT} = C2*R5*\frac{VOUT-VIN}{VOUT} \quad (6)$$

Figure 7:
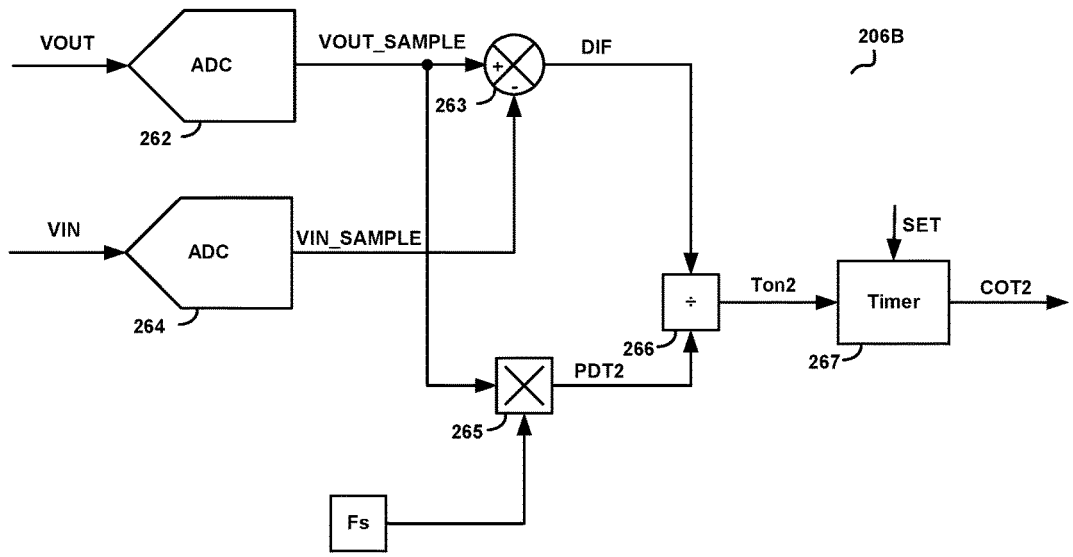
FIG. 7 schematically illustrates a second on-time control circuit 206B in accordance with an embodiment of the present invention.

FIG. 7 schematically illustrates a second on-time control circuit 206B in accordance with an embodiment of the present invention. It includes ADC 262, 264, a subtracter 263, a multiplier 265, a divider 266 and a timer 267. The ADC 262 and 264 respectively converts the output voltage VOUT and the input voltage VIN into digital signals VOUT_SAMPLE and VIN_SAMPLE. The subtracter 263 subtracts the signal VIN_SAMPLE from the signal VOUT_SAMPLE to provide a difference signal DIF. The multiplier 263 multiplies the signal VOUT_SAMPLE with the frequency signal Fs to get a product signal PDT2. The divider 266 divides the difference signal DIF by the product signal PDT2 to generate the second time threshold Ton2, and subsequently sends it into the timer 267. The timer 267 starts timing at the rising edge of the set signal SET, and turns the second on-time control signal COT2 from logical low into logical high when the time value reaches the second time threshold Ton2.

The second time threshold Ton2 in the embodiment of FIG. 7 could be expressed as:

$$Ton2 = \frac{VOUT\_SAMPLE - VIN\_SAMPLE}{VOUT\_SAMPLE*Fs} = Tperiod*\frac{VOUT-VIN}{VOUT} \quad (7)$$

Figure 8:
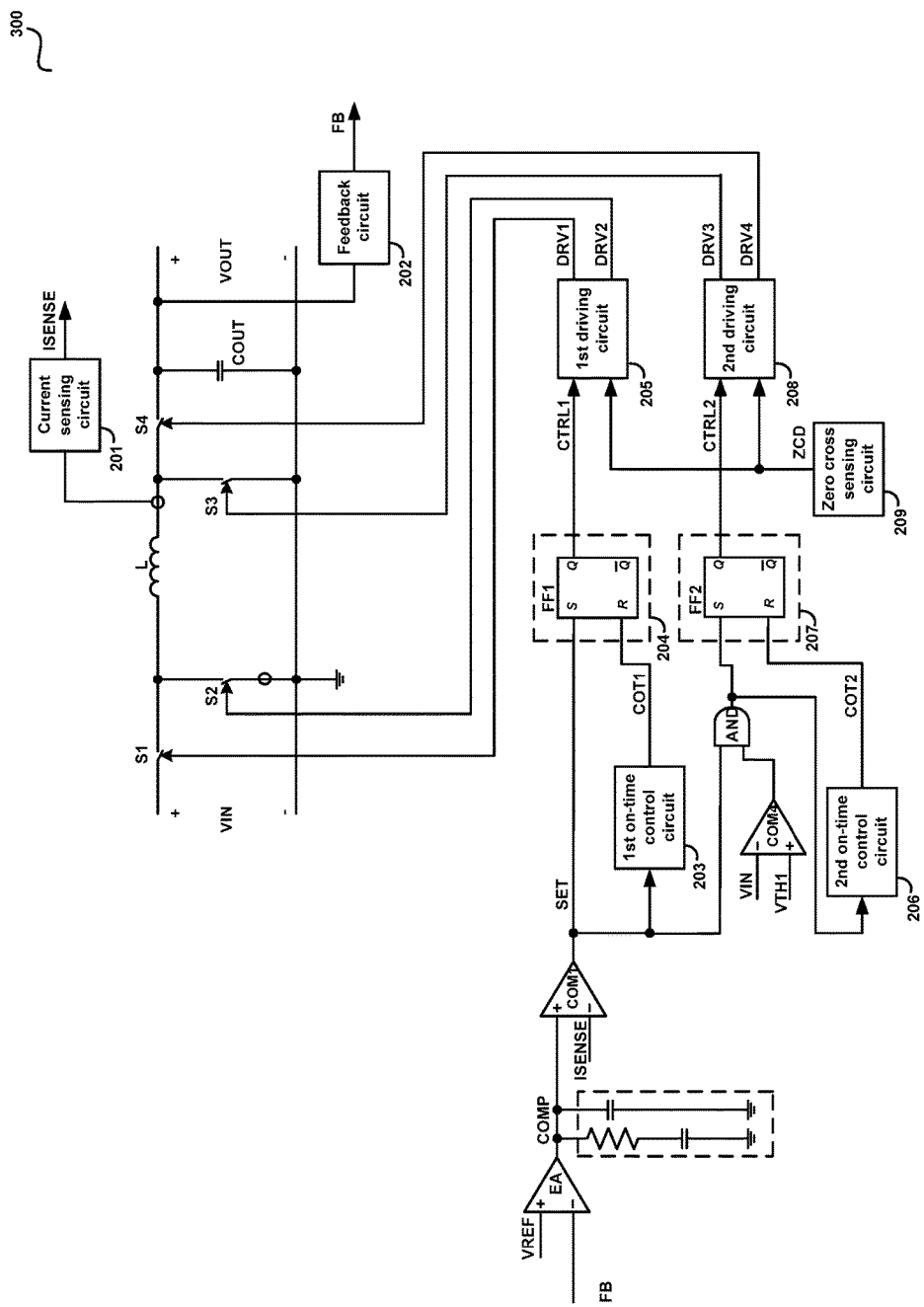
FIG. 8 is a working state diagram of the buck-boost converter 300 in accordance with an embodiment of the present invention.

FIG. 8 is a working state diagram of the buck-boost converter 300 in accordance with an embodiment of the present invention. In this embodiment, a comparator COM4 comparing the input voltage with a threshold voltage VTH1, and a logic gate circuit (e.g. an AND gate) are further incorporated. The threshold voltage VTH1 is set based on the output voltage VOUT. It could be equal to the output voltage VOUT, or slightly higher than the output voltage, for example, 110%*VOUT. The AND gate has a first input terminal, a second input terminal and an output terminal, wherein the first terminal is coupled to the output of the comparator COM1 to receive the set signal SET, the second input terminal is coupled to the output terminal of the comparator COM4, and the output terminal is coupled to the set terminal of the flip-flop FF2 and the input terminal of the second on-time control circuit 206. By doing so, the flip-flop FF2 will not be set to turn on the transistor S3 and turn off the transistor S4 unless the input voltage VIN is lower than the threshold voltage VTH1.

In order to achieve stable mode transition, an offset value may be added into the second time threshold Ton2. The second time threshold Ton in this situation could be expressed as:

$$Ton2 = Tperiod*\left(\frac{VOUT-VIN}{VOUT} + OFFSET\right) \quad (8)$$

The offset value OFFSET is determined by practical applications, and could be, for instance, 10%.

Figure 9:
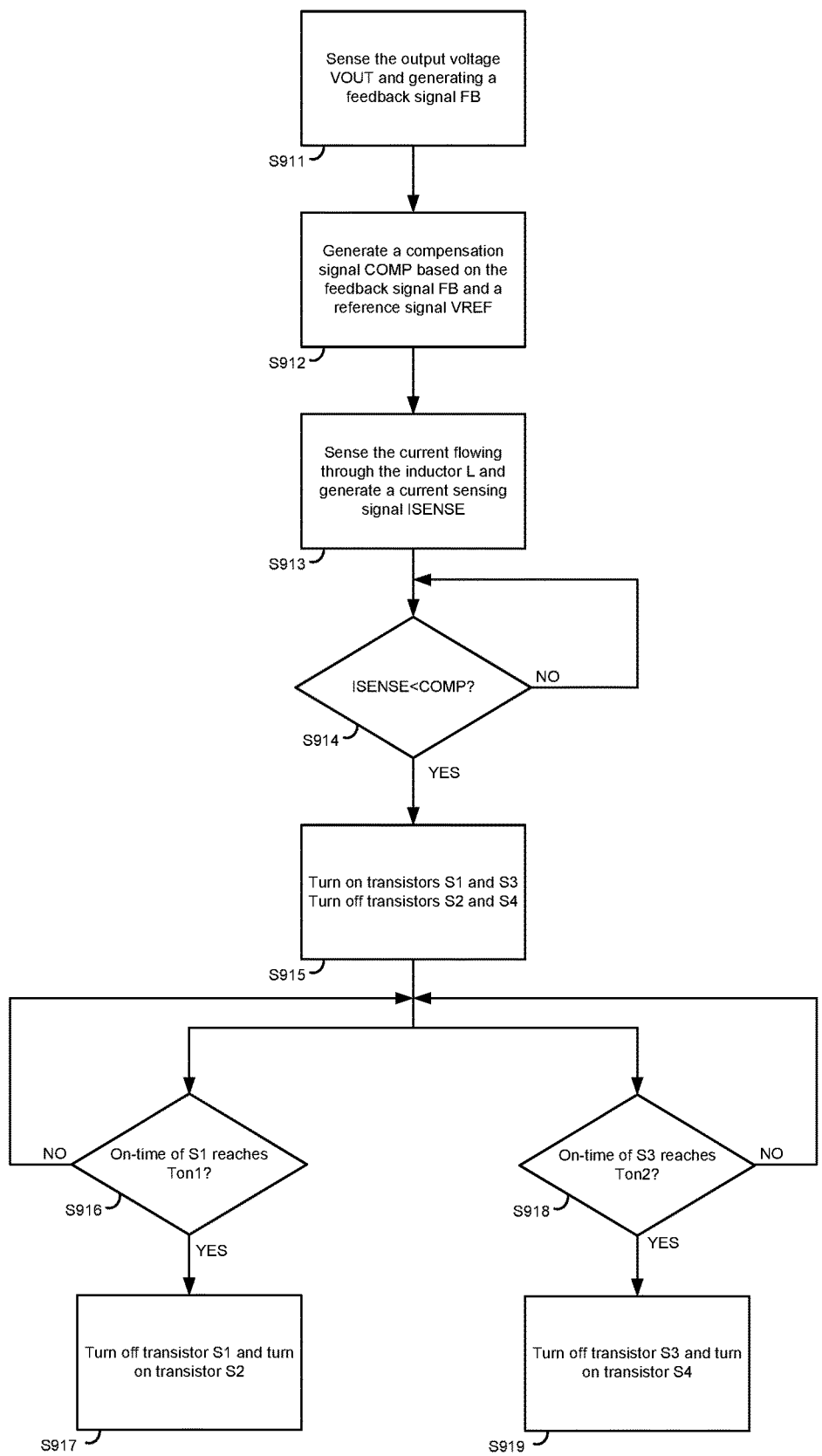
FIG. 9 is a working flowchart of a method for controlling a buck-boost converter in accordance with an embodiment of the present invention.

FIG. 9 is a working flowchart of a method for controlling a buck-boost converter in accordance with an embodiment of the present invention. It comprises steps S911~S919.

At step S911, the output voltage VOUT is sensed to generate a feedback signal FB indicative of it.

At step S912, a compensation signal COMP is generated based on a reference signal VREF and the feedback signal FB.

At step S913, the current flowing through the inductor L is sensed to generate a current sensing signal ISENSE.

At step S914, the current sensing signal ISENSE and the compensation signal COMP are compared with each other. If the current sensing signal ISENSE is lower than the compensation signal COMP, the process will go to S915, otherwise, it will keep waiting.

At step S915, the transistors S1 and S3 are turned on, and the transistors S2 and S4 are turned off.

At step S916, whether the on-time of the transistor S1 reaches a first time threshold Ton1 is detected. If the on-time of the transistor S1 reaches the first time threshold Ton1, the process proceeds to step S917.

At step S917, the transistor S1 is turned off and the transistor S2 is turned on.

At step S918, whether the on-time of the transistor S3 reaches a second time threshold Ton2 is detected. If the on-time of the transistor S3 reaches the second time threshold Ton2, the process will proceed to step S919.

At step S919, the transistor S3 is turned off and the transistor S4 is turned on.

In some embodiments, the control method could further include: detecting whether the current flowing through the inductor L crosses zero; and turning off the transistors S2 and S4, or turning on the transistors S2 and S3 if a zero cross of the inductor current has been detected.

Figure 10:
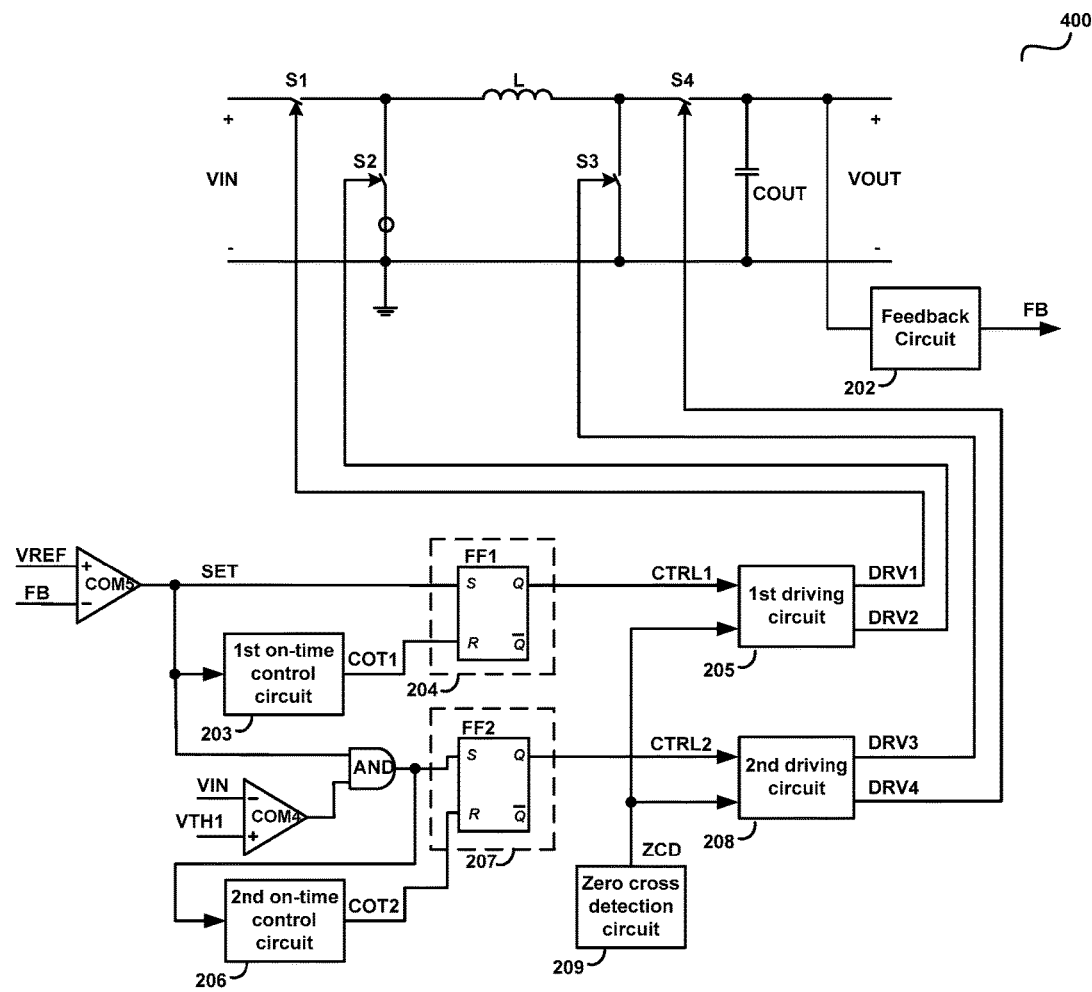
FIG. 10 is a block diagram of a buck-boost converter 400 in accordance with an embodiment of the present invention.

Although the set signal SET is generated by the comparison between the current sensing signal ISENSE and the compensation signal COMP in the embodiment of FIG. 2, it should be noted that this is not used to limit the scope of the present invention. As shown in FIG. 10, the set signal SET can also be provided through directly comparing the feedback signal FB with the reference signal VREF. Once the feedback signal FB reduces to be lower than the reference signal VREF, the transistors S1 and S3 turn on, and the transistors S2 and S4 turn off. Furthermore, a ramp compensation is typically incorporated into the feedback signal FB or the reference signal VREF to avoid sub-harmonic oscillation.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control method of a buck-boost converter, wherein the buck-boost converter converting an input voltage into an output voltage includes a first transistor, a second transistor, a third transistor, a fourth transistor and an inductor, the control method comprises:

sensing the output voltage and generating a feedback signal;

generating a compensation signal based on a reference signal and the feedback signal;

sensing the current flowing through the inductor and generating a current sensing signal;

comparing the current sensing signal with the compensation signal;

turning on the first and third transistors and turning off the second and fourth transistors when the current sensing signal reduces to be lower than the compensation signal;

turning off the first transistor and turning on the second transistor when the on-time of the first transistor in one switching period reaches a first time threshold; and turning off the third transistor and turning on the fourth transistor when the on-time of the third transistor reaches a second time threshold.

2. The control method of claim 1, wherein the first time threshold is proportional to the output voltage and inversely proportional to the input voltage, and wherein the second time threshold is proportional to the difference between the output voltage and the input voltage, and is inversely proportional to the output voltage.

3. The control method of claim 2, wherein an offset value is added into the second time threshold.

4. The control method of claim 1, further comprising:

detecting whether the current flowing through the inductor crosses zero; and turning off the second and fourth transistors, or turning on the second and third transistors when a zero cross of the inductor current has been detected.

5. A buck-boost converter comprising:

a first transistor having a first terminal, a second terminal and a control terminal, wherein the first terminal is configured to receive an input voltage;

a second transistor having a first terminal, a second terminal and a control terminal, wherein the first terminal is coupled to the second terminal of the first transistor, the second terminal is coupled to a reference ground;

an inductor having a first terminal and a second terminal, wherein the first terminal is coupled to the second terminal of the first transistor and the first terminal of the second transistor;

a third transistor having a first terminal, a second terminal and a control terminal, wherein the first terminal is coupled to the second terminal of the inductor, the second terminal is coupled to the reference ground;

a fourth transistor having a first terminal, a second terminal and a control terminal, wherein the first terminal is coupled to the second terminal of the inductor and the first terminal of the third transistor, the second terminal is configured to provide an output voltage;

an output capacitor coupled between the second terminal of the fourth transistor and the reference ground;

a feedback circuit configured to generate a feedback signal indicative of the output voltage;

a current sensing circuit configured to generate a current sensing signal indicative of the current flowing through the inductor;

an error amplifying circuit having a first input terminal, a second input terminal and an output terminal, wherein the first input terminal is configured to receive a reference signal, the second input terminal is coupled to the feedback circuit, and wherein based on the reference signal and the feedback signal, the error amplifying circuit generates a compensation signal at the output terminal;

a comparing circuit having a first input terminal, a second input terminal and an output terminal, wherein the first input terminal is coupled to the output terminal of error amplifying circuit, the second input terminal is coupled to the current sensing circuit, and wherein the comparing circuit compares the current sensing signal with the compensation signal and generates a set signal at the output terminal;

a first on-time control circuit having an input terminal and an output terminal, wherein the input terminal is coupled to the output terminal of the comparing circuit, and wherein based on the set signal, the first on-time control circuit compares the on-time of the first transistor in one switching period with a first time threshold and generates a first on-time control signal at the output terminal;

a second on-time control circuit having an input terminal and an output terminal, wherein the input terminal is coupled to the output terminal of the comparing circuit, and wherein based on the set signal, the second on-time control circuit compares the on-time of the third transistor with a second time threshold and generates a second on-time control signal at the output terminal;

a first logic circuit having a first input terminal, a second input terminal and an output terminal, wherein the first input terminal is coupled to the output terminal of the comparing circuit, the second input terminal is coupled to the output terminal of the first on-time control circuit, and wherein based on the set signal and the first on-time control signal, the first logic circuit generates a first control signal at the output terminal;

a second logic circuit having a first input terminal, a second input terminal and an output terminal, wherein the first input terminal is coupled to the output terminal of the comparing circuit, the second input terminal is coupled to the output terminal of the second on-time control circuit, and wherein based on the set signal and the second on-time control signal, the second logic circuit generates a second control signal at the output terminal;

a first driving circuit coupled to the output terminal of the first logic circuit, wherein based on the first control signal, the first driving circuit generates a first driving signal and a second driving signal to respectively control the first and second transistors; and a second driving circuit coupled to the output terminal of the second logic circuit, wherein based on the second control signal, the second driving circuit generates a third driving signal and a fourth driving signal to respectively control the third and fourth transistors.

6. The buck-boost converter of claim 5, wherein the first time threshold is proportional to the output voltage and inversely proportional to the input voltage, and wherein the second time threshold is proportional to the difference between the output voltage and the input voltage, and is inversely proportional to the output voltage.

7. The buck-boost converter of claim 6, wherein an offset value is added into the second time threshold.

8. The buck-boost converter of claim 5, further comprising:

a zero cross detection circuit coupled to the first and second driving circuits, wherein the zero cross detection circuit is configured to detect whether the current flowing through the inductor crosses zero, and is configured to turn off the second and fourth transistors, or turn on the second and third transistors when a zero cross of the inductor current has been detected.

9. The buck-boost converter of claim 5, further comprising:

a comparator having a first input terminal, a second input terminal and an output terminal, wherein the first input terminal is configured to receive the input voltage, the second input terminal is configured to receive a threshold voltage related to the output voltage; and a logic gate circuit having a first input terminal, a second input terminal and an output terminal, wherein the first input terminal is coupled to the output terminal of the comparing circuit, the second input terminal is coupled to the output terminal of the comparator, and the output terminal is coupled to the input terminal of the second on-time control circuit and the first input terminal of the second logic circuit.

10. A controller used in a buck-boost converter, wherein the buck-boost converter converting an input voltage into an output voltage includes a first transistor, a second transistor, a third transistor, a fourth transistor and an inductor, the controller comprises:

a comparing circuit configured to receive a feedback signal indicative of the output voltage and generate a set signal in accordance with the feedback signal;

a first on-time control circuit having an input terminal and an output terminal, wherein the input terminal is coupled to the comparing circuit, and wherein based on the set signal, the first on-time control circuit compares the on-time of the first transistor in one switching period with a first time threshold and generates a first on-time control signal at the output terminal;

a second on-time control circuit having an input terminal and an output terminal, wherein the input terminal is coupled to the comparing circuit, and wherein based on the set signal, the second on-time control circuit compares the on-time of the third transistor with a second time threshold and generates a second on-time control signal at the output terminal;

a first logic circuit having a first input terminal, a second input terminal and an output terminal, wherein the first input terminal is coupled to the output terminal of the comparing circuit, the second input terminal is coupled to the output terminal of the first on-time control circuit, and wherein based on the set signal and the first on-time control signal, the first logic circuit generates a first control signal at the output terminal;

a second logic circuit having a first input terminal, a second input terminal and an output terminal, wherein the first input terminal is coupled to the output terminal of the comparing circuit, the second input terminal is coupled to the output terminal of the second on-time control circuit, and wherein based on the set signal and the second on-time control signal, the second logic circuit generates a second control signal at the output terminal;

a first driving circuit coupled to the output terminal of the first logic circuit, wherein based on the first control signal, the first driving circuit generates a first driving signal and a second driving signal to respectively control the first and second transistors; and a second driving circuit coupled to the output terminal of the second logic circuit, wherein based on the second control signal, the second driving circuit generates a third driving signal and a fourth driving signal to respectively control the third and fourth transistors.

11. The controller of claim 10, further comprises an error amplifying circuit having a first input terminal, a second input terminal and an output terminal, wherein the first input terminal is configured to receive a reference signal, the second input terminal is configured to receive the feedback signal, and wherein based on the reference signal and the feedback signal, the error amplifying circuit generates a compensation signal at the output terminal; wherein the comparing circuit has a first input terminal, a second input terminal and an output terminal, the first input terminal is coupled to the output terminal of error amplifying circuit, the second input terminal is configured to receive a current sensing signal indicative of the current flowing through the inductor, and wherein the comparing circuit compares the current sensing signal with the compensation signal and generates the set signal at the output terminal.

12. The controller of claim 10, wherein the comparing circuit has a first input terminal, a second input terminal and an output terminal, the first input terminal is configured to receive a reference signal, the second input terminal is configured to receive the feedback signal, and wherein the comparing circuit compares the reference signal with the feedback signal and generates the set signal at the output terminal.

13. The controller of claim 10, wherein the first time threshold is proportional to the output voltage and inversely proportional to the input voltage, and wherein the second time threshold is proportional to the difference between the output voltage and the input voltage, and is inversely proportional to the output voltage.

14. The controller of claim 10, wherein an offset value is added into the second time threshold.

15. The controller of claim 10, further comprising:

a zero cross detection circuit coupled to the first and second driving circuits, wherein the zero cross detection circuit is configured to detect whether the current flowing through the inductor crosses zero, and is configured to turn off the second and fourth transistors, or turn on the second and third transistors when a zero cross of the inductor current has been detected.

16. The controller of claim 10, further comprising:

a comparator having a first input terminal, a second input terminal and an output terminal, wherein the first input terminal is configured to receive the input voltage, the second input terminal is configured to receive a threshold voltage related to the output voltage; and a logic gate circuit having a first input terminal, a second input terminal and an output terminal, wherein the first input terminal is coupled to the output terminal of the comparing circuit, the second input terminal is coupled to the output terminal of the comparator, and the output terminal is coupled to the input terminal of the second on-time control circuit and the first input terminal of the second logic circuit.

* * * * *